March 16, 1954 M. J. LAUDAHL 2,672,221
TRAILER HITCH AND AUTOMATIC BRAKE ACTUATOR
Filed June 20, 1949 2 Sheets-Sheet 1
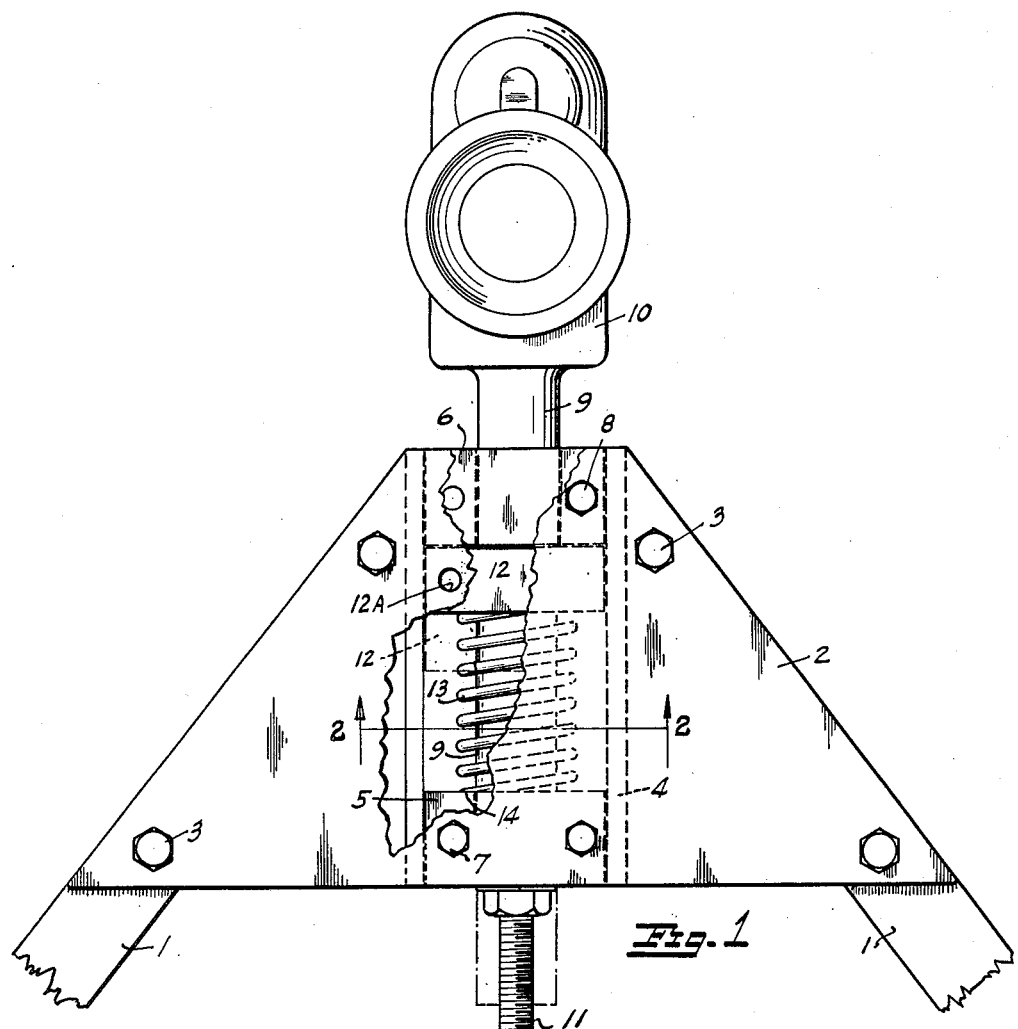
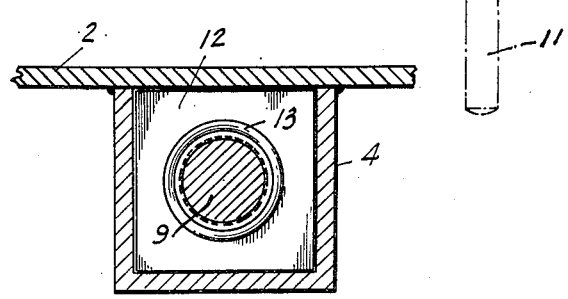
MARK J. LAUDAHL
INVENTOR.
BY James D. Givnau
ATTY

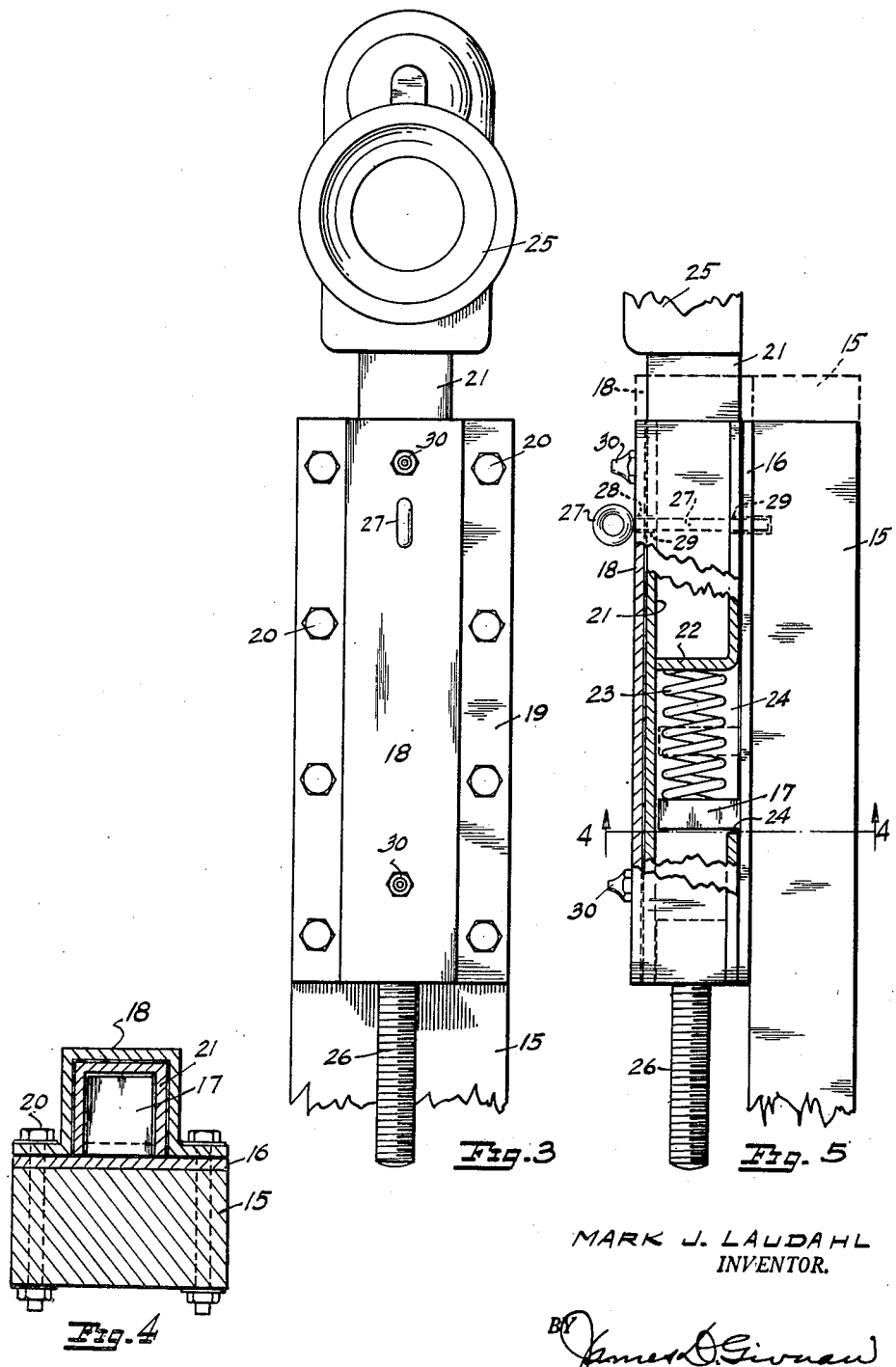

Patented Mar. 16, 1954

2,672,221

UNITED STATES PATENT OFFICE 2,672,221

TRAILER HITCH AND AUTOMATIC BRAKE ACTUATOR

Mark J. Laudahl, Dallas, Oreg.

Application June 20, 1949, Serial No. 100,193

1 Claim. (Cl. 188—112)

This invention relates to improvements in a trailer hitch including means for automatically actuating the brakes of the trailer.

It is one of the principal objects of the present invention to provide a hitch of this character which is of simple, efficient, durable and inexpensive construction made of only two parts movable with respect to each other for actuating a master brake cylinder carried by the trailer or vehicle being towed for actuating the brakes thereon.

The foregoing and other objects will appear as my invention is more fully hereinafter described in the following specification, illustrated in the accompanying drawings and finally pointed out in the appended claim.

In the drawings:

Figure 1 is a top plan view of the invention shown applied to a section of the forward end of a trailer and with a section broken away for convenience of illustration.

Figure 2 is a sectional end elevation taken approximately along the line 2—2 of Figure 1.

Figure 3 is a top plan view of a modified form of the invention.

Figure 4 is a sectional end elevation taken approximately along the line 4—4 of Figure 5.

Figure 5 is a side elevation of Figure 3 with fragments broken away.

Referring more particularly to the drawings:

In Figure 1, reference numeral 1, indicates the forward end of the frame or chassis members of a trailer or vehicle being towed. The forward end of these frame members may, of course, be parallel with each other or converge as shown. In either case I secure a plate 2 to the forward end of the frame by any suitable means, such as bolts 3 or by welding if desired. Secured by welding or the like to the underside of the plate 2 and depending therefrom is an elongated housing 4 closed at both of its ends by bearing blocks 5 and 6 secured to the housing and to the plate 2 by means of bolts 7 and 8 respectively. Slidably mounted through both bearing blocks is a draw-bar 9 terminating at its forward end in any approved type of trailer coupling generally indicated at 10. The opposite end of the draw-bar is reduced and threaded as at 11 for adjustable attachment to any approved type of master brake cylinder (not shown) or to any approved type of mechanical or other braking mechanism carried by the trailer and adapted to actuate the brakes thereon upon forward movement of the trailer with respect to the coupling 10. That portion of the draw-bar 9 disposed between the bearing blocks 5 and 6 is formed with an enlargement of square formation to provide an abutment 12, which at all times bears against one end of a compression spring 13 whose opposite end, as indicated at 14, bears against the inside of the bearing block 5. As long as the trailer is being pulled the abutment 12 will bear against the forward bearing block 6.

When, however, the towing vehicle to which the coupling 10 is secured, reduces its forward speed, or when brought to a complete stop the trailer through the medium of the plate 2 will move the housing 4 forwardly with respect to the draw-bar 9 and the abutment 12 carried thereby. This, of course, compresses the spring 13 and projects the trailing end of the draw-bar 9 rearwardly from the housing 4 and bearing block 5 into the approximate position shown in broken lines. This, of course, applies an equal amount of thrust or movement to the brake actuating mechanism to which the reduced end 11 of the draw-bar 9 is attached with a resultant application of the brakes on the trailer.

In the modified form of the invention illustrated in Figures 3, 4 and 5 reference numeral 15 indicates the forward end of a trailer tongue having a flat top surface to which I secure a base plate 16. A vertical abutment 17 is secured to the plate 16 by any suitable means such as welding or the like. Secured to the plate 16 and to the trailer tongue is an elongated housing 18 flanged as at 19. The housing and plate 16 are secured together and to the trailer tongue by means of bolts 20 extending through the flanges 19 and plate 16.

Slidably mounted within the housing 18 is a draw-bar 21 of square tubular form having a portion of its bottom wall cut and turned at right angles to itself as at 22 and secured by welding or the like to the top wall of the tube to form an abutment for one end of a compression spring 23 disposed within the tube and whose opposite end bears against the abutment 17 carried by the plate 16. Said abutment 17 is slidable lengthwise within an elongated opening 24 formed in the bottom wall of the tube through which the abutment extends.

The forward end of the draw-bar 21 terminates in any approved type of trailer coupling generally indicated at 25. The opposite end of the draw-bar is provided with a threaded extension 26 adapted for attachment to any conventional braking system and operable by a rearward thrust of the draw-bar.

As in the operation of the form of the invention shown in Figures 1 and 2 stoppage or slowing down of the towing vehicle will cause the trailer by its own momentum to move forwardly with respect to the towing vehicle. This forward movement of the trailer tongue and the abutment 17, carried by the plate 16 secured to the tongue, will compress the spring 23 as the housing, plate and tongue move forward with respect to the draw-bar which is held against forward movement by the towing vehicle. This forward movement of the trailer imparts the equivalent of a rearward thrust to the draw-bar 21 for actuating the braking mechanism to which it is attached.

It is to be understood that this form of the invention may be applied to either the top surface of the tongue as shown or to the underside thereof without affecting its operation.

For locking the draw-bar 9 and the plate 2 against relative movement I form aligned apertures 12A in the plate 2 and abutment 12 into which a pin (not shown) may be inserted. Similarly the draw-bar 21 and the housing 18 may be locked together by inserting a pin 27 through apertures 28 and 29 formed respectively in the housing and draw-bar and plate 16.

To lubricate the interior of the housing I provide fittings 30 to the exterior thereof.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

A trailer-hitch comprising in combination an elongated horizontal plate secured to the flat top surface of the forward end of a tongue of a trailer, an elongated housing of square formation in cross-section secured to said plate and to said tongue, a drawbar of square hollow tubular formation in cross-section of greater length than said housing and being slidably mounted lengthwise within the housing and terminating at one of its ends in a coupling and at its opposite end in a threaded extension, an elongated opening in the bottom wall of said drawbar, said opening being formed by a portion of the bottom wall of said drawbar being turned upwardly to the interior of the drawbar to form a vertical abutment therein, a second vertical abutment secured to said plate and extending into the interior of said drawbar through said opening formed therein and in spaced relation to said first mentioned abutment, a coil spring disposed within the drawbar and having one of its ends bearing against the first mentioned abutment and its opposite end bearing against said second abutment for normally maintaining said drawbar in a forward position with respect to said housing.

MARK J. LAUDAHL.

References Cited in the file of this patent

UNITED STATES PATENTS

| Number | Name | Date |
|---|---|---|
| 1,331,421 | Doe | Feb. 17, 1920 |
| 2,040,728 | Bulmer | May 12, 1936 |
| 2,127,912 | Graham et al. | Aug. 23, 1938 |
| 2,168,058 | Browne | Aug. 1, 1939 |
| 2,260,637 | Ovenhouse | Oct. 28, 1941 |
| 2,497,016 | Roberts | Feb. 7, 1950 |